United States Patent

Frentrop et al.

[15] 3,662,179
[45] May 9, 1972

[54] PULSE NEUTRON LOGGING TOOL CONTROL AND TRANSMISSION SYSTEM

[72] Inventors: Arthur H. Frentrop; John S. Wahl, both of Ridgefield, Conn.

[73] Assignee: Schlumberger Technology Corporation, New York, N.Y.

[22] Filed: Apr. 25, 1969

[21] Appl. No.: 819,378

[52] U.S. Cl. .................................. 250/83.3 R, 250/83.6 W
[51] Int. Cl. .................................................. G01v 5/00
[58] Field of Search ............... 250/83.6 W, 83.6 P, 83.3, 71.5

[56] References Cited

UNITED STATES PATENTS

| | | | |
|---|---|---|---|
| 3,492,481 | 1/1970 | Buck et al. | 250/83.6 W |
| 3,508,052 | 4/1970 | Seevers | 250/83.6 W |
| 3,518,623 | 6/1970 | Langford | 250/83.6 W |

Primary Examiner—Archie R. Borchelt
Attorney—William R. Sherman, Donald H. Fidler, Stewart F. Moore and John P. Sinnott

[57] ABSTRACT

An illustrative embodiment of the invention measures the thermal neutron decay time in earth formations traversed by a borehole. For example, with a latching relay downhole, only one electrical conductor and a ground return is needed to send power and neutron generator control signals to the logging tool. The repetition rate and the duration of the neutron bursts, as well as the decay time measurements, all are regulated automatically through downhole circuits in response to the neutron characteristics of the formation under study. The single conductor and ground return also transmit the decay time measurements to the earth's surface. A gate enabling relay downhole also responds to direct current signals and selects detector count information for transmission to the surface through a manipulation of the thermal neutron decay time information signal polarity. Other information signals, of which casing collar locator signals are typical, also can be transmitted through the conductor.

6 Claims, 6 Drawing Figures

CABLE TRANSMISSION DRIVER CIRCUIT

PULSE NEUTRON LOGGING TOOL CONTROL AND TRANSMISSION SYSTEM

BACKGROUND OF THE INVENTION

1. Field of the Invention

This invention relates to measuring techniques and, more particularly, to methods and apparatus for logging characteristics of borehole-traversed earth formations through neutron pulse effects, and the like.

2. Description of the Prior Art

The identification of a chlorine concentration in an earth formation frequently indicates an absence of hydrocarbons within the formation under investigation. For example, a high chlorine concentration suggests that the formation contains salt water to the exclusion of an economically interesting deposit of oil or gas. A low chlorine concentration in a porous rock structure, however, indicates that a significant accumulation of hydrocarbons might be present in the formation because of the apparent absence of much of the salt water that ordinarily would have occupied the formation pores.

Typically, chlorine measurements of this sort are obtained by drawing a logging tool through a borehole that penetrates the formation in question. A source within the tool irradiates the formation with repetitive bursts or pulses of neutrons. Most of the neutrons in these pulses diffuse through the surrounding earth formation and collide with the nuclei of the constituent materials.

The individual neutrons usually lose energy in these collisions until the energy of the neutrons, as expressed in terms of their average speed, reaches an equilibrium with the atomic structure of the formation. These "thermal" neutrons are absorbed in the formation nuclei with probabilities that vary according to each of the different elements present. The chlorine in saline formation water, for example, exhibits an extremely high thermal neutron absorption cross section in comparison with the carbon atoms that are common to petroleum deposits.

As a consequence of these thermal neutron absorptions, the absorbing nuclei emit gamma rays that are scattered back to the logging tool. A gamma ray detector in the tool registers a number of these back-scattered radiations and sends signals to the processing circuit for transmission to the earth's surface. These transmitted signals subsequently are interpreted in terms of the formation's thermal neutron absorption properties, in which a relatively short thermal neutron absorption time indicates a high chlorine concentration. This time often is expressed as the thermal neutron decay time, $\tau$, of the formation and is defined as the time required for the thermal neutron population in the formation to decrease by a factor of $1/e$, where $e$ is the natural logarithm base 2.718.

Because power must be sent downhole to the logging tool and the pulse rate of information content of the signal transmitted to the earth's surface is so great, a large number of electrical conductors are needed within the cable that is used to draw the tool through the borehole. Additional transmission capacity also is required to carry downhole the control signals that regulate the operation of the neutron source.

Because of these transmission requirements, inherently large diameter seven-conductor armored cables ordinarily are used with pulse neutron tools. These multiconductor cables, however, not only are expensive but also are difficult to use in small diameter deep boreholes.

When the borehole is under pressure, moreover, larger diameter multiconductor cables are subject to a further and more subtle disadvantage. In these pressurized wells, the cable is drawn out through a packer at the top of the borehole. Forces of 1,000 pounds or more frequently are established at the packer. These forces tend to expel the tool and the cable from the well. Because these forces vary in accordance with the square of the cable radius, a relatively small reduction in the cable diameter can produce a significant decrease in the expulsion force.

Accordingly, a need exists for a pulse neutron logging tool that can operate reliably with a small diameter cable.

SUMMARY OF THE INVENTION

In accordance with an exemplary embodiment of the invention, a single conductor cable, or "monocable," is used to transmit power and control information downhole to a pulse neutron logging tool. Within the downhole tool or "sonde," a circuit computes the thermal neutron decay time of the formation under investigation in response to signals from a radiation detector. The downhole circuit also controls the duration and repetition rate of the pulses of neutrons emitted from a neutron generator within the tool as a function of the thermal neutron absorption properties of the formation.

More particularly, a latching relay in the sonde responds to different direct current polarities that are applied to the monocable at the earth's surface in order to regulate the operational status of the neutron generator.

A cable driving circuit within the sonde, moreover, transmits information pulses of one polarity through the cable to the earth's surface. These pulses are spaced in time from each other at some fixed multiple of the formation's thermal neutron decay time. As an additional feature of this invention, the cable driving circuit changes the information pulse polarity each time a specific number of thermal neutron absorptions have been detected in a preselected portion of the operational cycle. The time between information pulses and the observed polarity change among these pulses enables the neutron count rate during the chosen interval to be determined.

Not only can a depth indicating casing collar locating signal be sent through the monocable along with the neutron absorption information, but other data, as for example, natural gamma radiation signals, also can be transmitted to the earth's surface.

More specifically, a typical system embodying the principles of the invention comprises a transformer on the earth's surface for coupling alternating current power to the monocable. A switch is provided to selectively connect positive or negative direct current to the monocable in order to activate a latching relay in the downhole sonde. The relay responds to these direct current signals by energizing the neutron generator to a point that is just short of neutron production ("retard" condition) and to neutron production ("full power" condition). The switch also connects a capacitor to the monocable in order to pass the casing collar locator signals from the logging tool to a recorder.

In the sonde, the alternating current received from the earth's surface is rectified in order to provide power for the downhole circuits. An output from oscillator triggers a program circuit that regulates, in turn, the duration and repetition rate of the neutron pulses emitted from the neutron generator.

A gate circuit also responds to enabling signals from the program circuit in order to activate a counter. The counter comprises a group of individual counting circuits that each respond to input signals from both a radiation detector and an additional group of signals from the program circuit. The output signals from the counter adjust the operation of a digitally controlled oscillator in order to vary the oscillator's output signal frequency.

The oscillator output signal frequency establishes a signal that is fed back to the program circuit in order to control the neutron pulse duration and repetition rate so that the burst width is, for example, 1 thermal neutron decay time in width, repeated at intervals each of 10 thermal neutron decay times in duration.

Within the signal gate circuit, the input pulses from the radiation detector during one of three possible time intervals are counted and cause the cable driver circuit to reverse the polarity of the information pulse that is transmitted to the earth's surface after a specific number of detector counts have been registered within the selected observation interval. The particular signal gate circuit, moreover, is enabled through a relay that is successively energized and de-energized by means of a sequence of direct current pulses of one polarity that are applied to the monocable at the earth's surface. Depending on the number of signal pulses sent to the gating relay, one of the aforementioned three possible intervals in the time between each pair of neutron pulses is chosen for detector count observation.

In this manner, not only does the spacing between each successive pair of information pulses correspond to a fixed multiple of the thermal neutron decay time characterizing the formation under consideration, but the polarity of these pulses indicates the actual number of observed detector counts registered during a portion of each cycle of tool operation.

The individually transmitted information pulses, moreover, are degraded in quality as a consequence of their passage through several thousand feet of monocable in a borehole environment. Typically, the monocable characteristics change a sharply define rectangular unipolar input pulse to an output at the earth's surface that has the general appearance of a small burst of alternating current in which the amplitude first increases and then decreases. The relative polarities of the current lobes that comprise the information signal at the cable output depend on the polarity of the downhole cable input pulse. For example, a positive polarity information input pulse is received on the earth's surface as a positive alternation followed by a negative lobe of somewhat greater absolute amplitude, and so on, until a lobe of maximum absolute amplitude is reached. Thereafter, the absolute amplitudes of the alternations decrease until the signal is no longer detectable.

The negative information pulses, which for illustrative purposes have been chosen to indicate the detector counts are, at the earth's surface, mirror images of the cable output signals produced in response to the downhole positive input pulses. To distinguish the character or polarity of the downhole input signal, a signal amplitude discrimination level is set at the earth's surface to eliminate noise. Above this pre-established discrimination level, trigger circuits register the number of positive alternations and the position of these positive alternations relative to the negative signal lobes. In this way, circuits on the earth's surface generate one of two possible signals in response to the order of relative polarities characterizing the cable output signal. One of these generated signals, when taken with the elapsed time since the preceding signal, indicates the thermal neutron decay time of the formation. The other of the generated signals provides not only an indication of the thermal neutron decay time, but also the observed thermal neutron capture gamma ray activity emanating from the formation under study during a selected part of each operation cycle. This system is so flexible, moreover, that other logging tool signals can be superimposed on the monocable, as, for instance, the aforementioned casing collar locator signal that is used to indicate the sonde depth.

For illustrative purposes, the method and apparatus characterizing this invention are described in a context in which the three detector signal observation intervals bear a specific relation to each other. For example, the first interval (which commences at a time $2\tau$ after the end of the neutron pulse) lasts for a time equal to $\tau$. Immediately after the first interval, a second observation interval occurs that is of $2\tau$ in duration. A third interval, of $3\tau$ in length, occurs only after a $\tau$ delay has been interposed at the termination of the second interval.

The third interval provides a "background count" that measures the "steady state" radioactivity of the earth formation, rather than the transient effect of a brief neutron pulse. The specific circuit chosen to describe the salient features of the invention subtracts from the counts observed during the first interval some of the counts registered during the background interval. Background counts also are subtracted from the counts in the second interval.

One-half of the background adjusted first interval counts then are contrasted with all of the background adjusted second interval counts. If these two groups of counts are equal in magnitude, the duration of the first interval is, in fact, equal to the thermal neutron decay time of the formation. If, however, the two groups of counts are not equal, the first interval duration is not equal to the formation's decay time and represents a time that might be termed an apparent decay time. In this latter instance, an error signal is generated that increases or decreases, as appropriate, the duration of all of the observation intervals until half the background adjusted first interval counts equal the counts in the similarly corrected second interval. On reading this last condition system equilibrium is restored and the observation interval durations once more are a function of $\tau$.

For a better understanding of the present invention together with other and further objects thereof, reference is had to the following description taken in connection with the accompanying drawings, the scope of the invention being pointed out in the appended claims.

DESCRIPTION OF THE PREFERRED EMBODIMENTS

Figure 1:
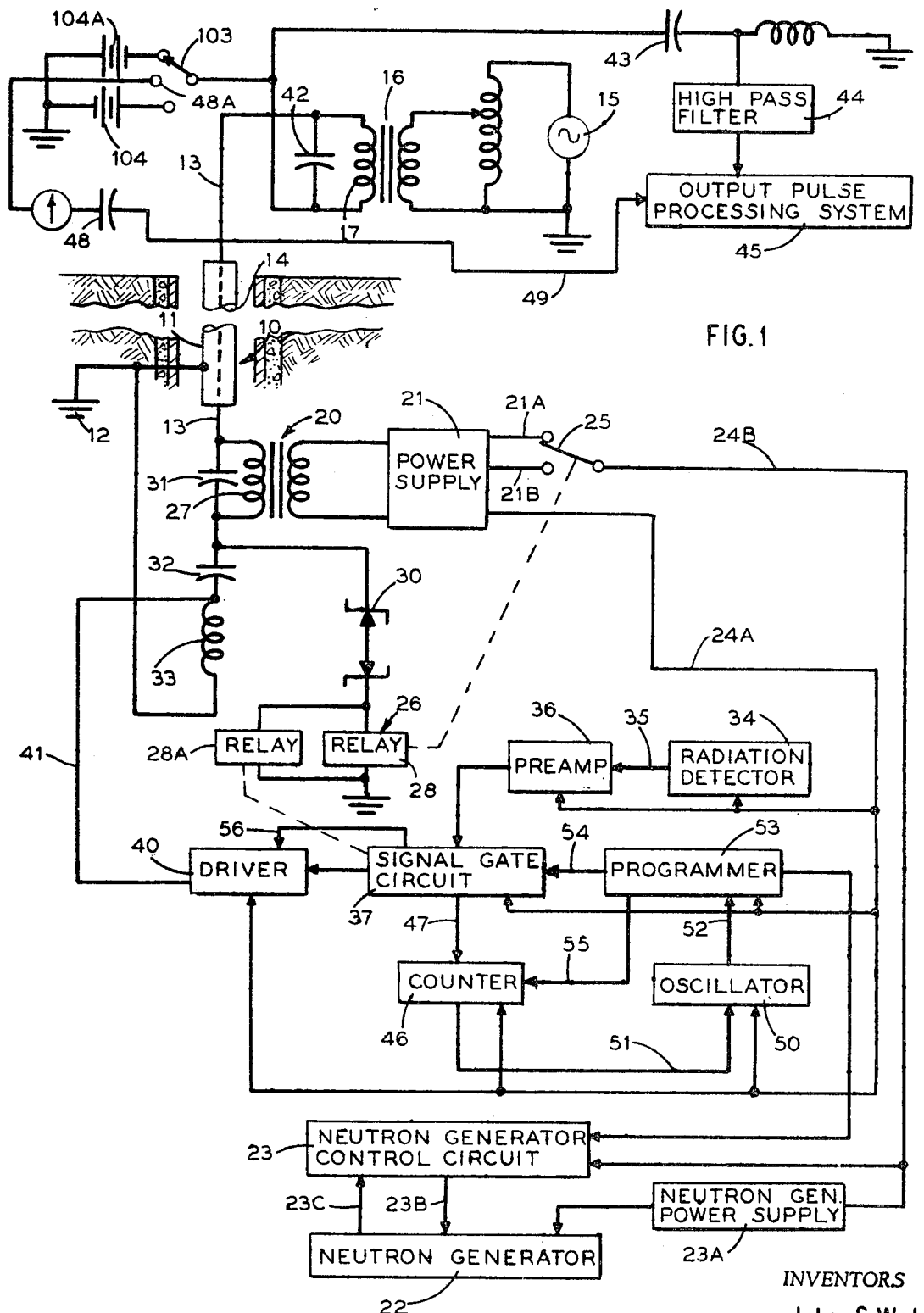
FIG. 1 is a schematic diagram of a pulse neutron logging tool embodying some of the features of the invention.

In accordance with the present invention, the observed thermal neutron capture gamma ray signals that characterize a formation's chlorine concentration are processed in the downhole sonde in order to alleviate problems inherent in the use of large diameter multiconductor cables. For example, in FIG. 1, an armored cable 10 (which armor 11 provides a convenient return to ground 12) has a conductor 13 that is electrically insulated from the armor 11 by nonconductive matrix 14. Preferably, the cable 10 is a "monocable" in which the conductor 13 is the only conductor in the cable, in order to obtain the described advantages that inure to monocable operation. The invention is, of course, also suitable for use with multiconductor cable. In this latter instance, the additional conductors can provide transmission capacity for signals from other borehole logging tools being run simultaneously with the pulse neutron apparatus under consideration. The present description, however, is directed to a monocable system for the purpose of illustration.

At the earth's surface an alternating current generator 15 applies 400 Hz (or cycles per second) power to a transformer 16 that is connected to the conductor 13. Downhole, in a liquid-tight housing (not shown) a transformer 20, also connected to the conductor 13, couples the 400 Hz power transmitted through the cable 10 to a downhole power supply 21. The power supply 21 is provided with rectification circuits in order to establish direct current voltages that energize the subsequently described circuit elements and establish the "retard" and "full" power operation conditions for a neutron generator 22.

In this connection, a downhole circuit power is available from the supply 21 through a conductor 24A. The retard power for the neutron generator 22 (in which the generator is energized for a standby condition in which no neutrons are produced) is coupled through a power supply terminal 21A, an operated switch 25 and a conductor 24B to a neutron generator control circuit 23 and a neutron generator power supply 23A. In order to produce neutrons, switching means 26 that preferably includes a latching relay 28 is activated in accordance with the invention to connect the switch 25 to a power supply output terminal 21B. The potential available at the terminal 21B is different from the retard potential at the terminal 21A. This "full" power voltage at the terminal 21B, when selectively coupled through the switch 25 to the conductor 24B, enables the generator control circuit 23 and the power supply 23A to establish gas ionization in the generator 22 and thus ultimately produce neutrons. The latching relay 28 shown in Flg. 1 is connected in a direct current path from ground that includes "drop over" zener diodes 30, the conductor 13 in the cable 10, and a primary winding 27 in the transformer 20. The diodes 30 establish a voltage drop of approximately 40 volts between the primary winding 27 and the relay 28. This voltage drop prevents noise and other signals in the conductor 13 from operating the switch means 26 in response to spurious signals.

The relay 28 responds to a negative pulse of direct current in the monocable 10 to connect the switch 25 to the power supply terminal 21A in order to establish retard status for the neutron generator 22. A positive direct current pulse in the monocable 10 energizes the relay 28 in order to operate the switch 25 to connect the full power terminal 21B to the conductor 24B. In this latter condition, the neutron generator control circuit 23 and the power supply 23A are conditioned to establish neutron production from the generator 22. Because the relay 28 is a latching relay, the initial positive direct current pulse causes the relay to hold the switch 25 operated so that a full power neutron generator status is achieved, in spite of subsequent deactivation or reactivation of the positive signal. The full power condition is changed, however, through a subsequent application of negative direct current to the monocable 10 that causes the relay 28 to restore the neutron generator 22 to the retard status.

The neutron generator 22 is controlled, moreover, to emit neutrons in pulses that have a duration and a repetition rate which preferably bear some relation to the thermal neutron absorption properties of the earth formation. For example, in the illustrative embodiment, neutron pulses are generated that have a duration of 1 thermal neutron decay time, $\tau$, repeated at $10\tau$ intervals of time. This necessarily requires the length and frequency of the neutron generator pulse to fluctuate in accordance with the observed neutron properties of the formation.

This pulse operation of the neutron generator 22 is governed through the neutron generator control circuit 23. As shown in FIg. 1, at "full" power operation, the ion source within the neutron generator is pulsed by means of signals that are sent from the control circuit 23, through a conductor 23B to the ion source (not shown) in the neutron generator 22. The number of neutrons generated in each burst is controlled through the ion beam current that strikes a neutron producing target (also not shown) in the generator 22. A signal corresponding to the beam current is sent from the generator through a conductor 23C to the control circuit 23. The control circuit 23 adjusts the ionizing gas pressure in the neutron generator 22 in response to beam current variation. These adjustments stabilize the generator's neutron production at a predetermined acceptable level.

Within the downhole sonde, a path to ground that parallels the aforementioned circuit for the switching means 26 is provided from the primary winding 27 through a capacitor 32 and a series connected choke coil 33. The capacitor 32 presents a substantially lower impedance to the 400 Hz power than the impedance of a capacitor 31 that is connected in parallel with the primary winding 27 of the downhole transformer 20. Through an appropriate choice of relative impedances, the 400 Hz alternating current applied to the cable 10 does not bypass the primary winding 27, because the winding and the capacitor 32 present a much lower impedance to the flow of alternating current than the impedance of the capacitor 31. As described subsequently in more complete detail, the balance of the circuit to the ground 12 through the choke coil 33 enables the higher frequency signals that are related to the formation's thermal neutron decay time to be coupled to the conductor 13 for transmission to the earth's surface without being shunted to the ground 12.

The neutrons that are thermalized and absorbed in the earth formation frequently produce "thermal capture gamma radiation," some of which is registered in a downhole radiation detector 34. Alternatively, the detector 34 can be of a sort that responds to the neutrons scattered back to the sonde from the earth formation, rather than to the gamma radiation that often results from neutron reaction with the formation. Parenthetically, a detector that responds directly to back-scattered neutrons also can observe other neutron phenomenon for processing in accordance with the invention. In this regard, neutron slowing down time and Fermi age are typical of the phenomena that can be subjected to a rewarding study. Usually, however, for thermal neutron decay analysis, it is preferable to observe thermal neutron capture gamma rays with the aid of a crystal or plastic scintillator that generates a brief flash of light in response to each incident ray. The scintillator is coupled optically to a photomultiplier (not shown) that produces electron charge pulses, each of which is generally proportional to the energy expanded by a respective gamma ray within the scintillator.

The charge pulses from the photomultiplier are coupled through a conductor 35 to a preamplifier 36 for further downhole processing. The output signals from the preamplifier are connected to a signal gate circuit 37. The signal gate circuit 37 in turn, sends the detector signals through a conductor 47 to a counter circuit 46. The counter circuit 46 carries out the background radiation adjustment or compensation previously described. The counter, moreover, also compares half of the background adjusted gamma radiation count observed during the first time interval and all of the compensated detector counts registered during the second interval that occur between the successive neutron pulses. The counter 46 determines the difference in detector counts in the observed ratio and a predetermined ratio of the counts in the first and second intervals. A difference signal generated in response to this comparison produces an error signal in a conductor 51. The error signal changes the output signal frequency of an oscillator 50 in accordance with the departure from the formation's actual decay rate that the error signal characterizes.

In the absence of an error signal, the output frequency of the oscillator 50 corresponds to a multiple of the thermal neutron decay time of the formation under observation. This oscillator output signal adjusts a programmer circuit 53 in order to regulate the operation of the signal gate circuit 37 and the neutron generator control circuit 23 through control signals that are coupled to conductors 54 and 56, respectively. Thus, the control signals from the programmer 53 establish neutron pulse widths that are $1\tau$ in duration repeated at intervals each of $10\tau$. The programmer 53 also transmits control signals through a conductor 54 to the signal gate circuit 37 in order to regulate the time position relative to the neutron pulse and the time duration of the detector count observation intervals. The programmer signals in the conductor 54 consequently establish the two successive detector signal observation times of $\tau$ and $2\tau$ in length, respectively, as well as a third interval of $3\tau$ in duration that registers the background signal. As hereinbefore mentioned, when the measured value of $\tau$ is equal to that of the formation, half of the sum of the background corrected detector counts in the first interval of $\tau$ duration is equal to the sum of the background corrected counts observed during the later-occuring second interval $2\tau$ duration. When this condition is established, the duration of the first interval is automatically equal to the formation's thermal neutron decay time. Differences, however, between this predetermined relationship indicates that the first interval duration is in error and is not a measure of the formation decay time. This error is eliminated through an adjustment in the observation interval durations that reflects the magnitude of the signal applied by the counter 46 to the oscillator 50 through the conductor 51.

A cable driver circuit 40 responds to signals from the gate circuit 37 in order to couple decay time signals to the conductor 13 in the armored cable 10 through a path that includes a conductor 41, and the capacitors 32 and 31. Because the capacitors 31 and 32 offer a low impedance to the relatively high frequency decay time signals, in contrast to the relatively high impedances present in the winding 27 and the choke coil 33, the decay signals are not grounded out, but are shunted past the transformer winding 27 and to the conductor 13 for transmission to the earth's surface.

Typically, the driver circuit 40 couples a rectangular pulse of positive polarity at intervals of 10τ in time to the conductor 13. Naturally, as the thermal neutron decay time of formation changes, the elapsed time between these 10τ pulses also changes. A further circuit within the driver 40 responds also to signals from the signal gate circuit 37 that are sent through a conductor 56. These signals reverse polarity of one of the 10τ pulses applied to the conductor 13 each time a predetermined number of gamma rays are registered in the detector 34 during one of the intervals that occur in each cycle of tool operation.

As hereinbefore mentioned, the gating relay 28A in the switching means 26 is selectively energized from the earth's surface by applying successive direct current pulses of positive polarity to the monocable 10. Each energizing pulse, in a sequence of three pulses selects one of three intervals in the 10τ operation cycles for count observation. For example, a first pulse of positive polarity applied to the relay 28A enables a gate in the signal gate circuit 37 to register the cumulative detector count that occurs during an interval of τ in length at a time that is 2τ intervals after the termination of each neutron pulse. A second positive pulse selects a second observation interval of 2τ in duration that occurs immediately after the first detector signal observation interval. A third pulse chooses a third observation interval of a time that is 3τ long and which occurs after a delay of 2τ in length after the termination of the second interval. A fourth pulse inhibits all three gates 113, 114 and 115. A fifth pulse selects once more the first detector signal observation interval. During these positive pulses, the latching relay remains "held down" or energized in order to maintain the neutron generator in full power status.

On the earth's surface these 10τ pulses pass through a capacitor 42 that is coupled to the conductor 13 in parallel with the secondary winding 17 of the transformer 16. These pulses then are transmitted through a capacitor 43 and a high frequency-passing filter 44 to an output pulse processing system 45 which preferably makes a record of the transmitted signals, as for example, a log of thermal neutron decay time as a function of borehole depth.

Figure 4:
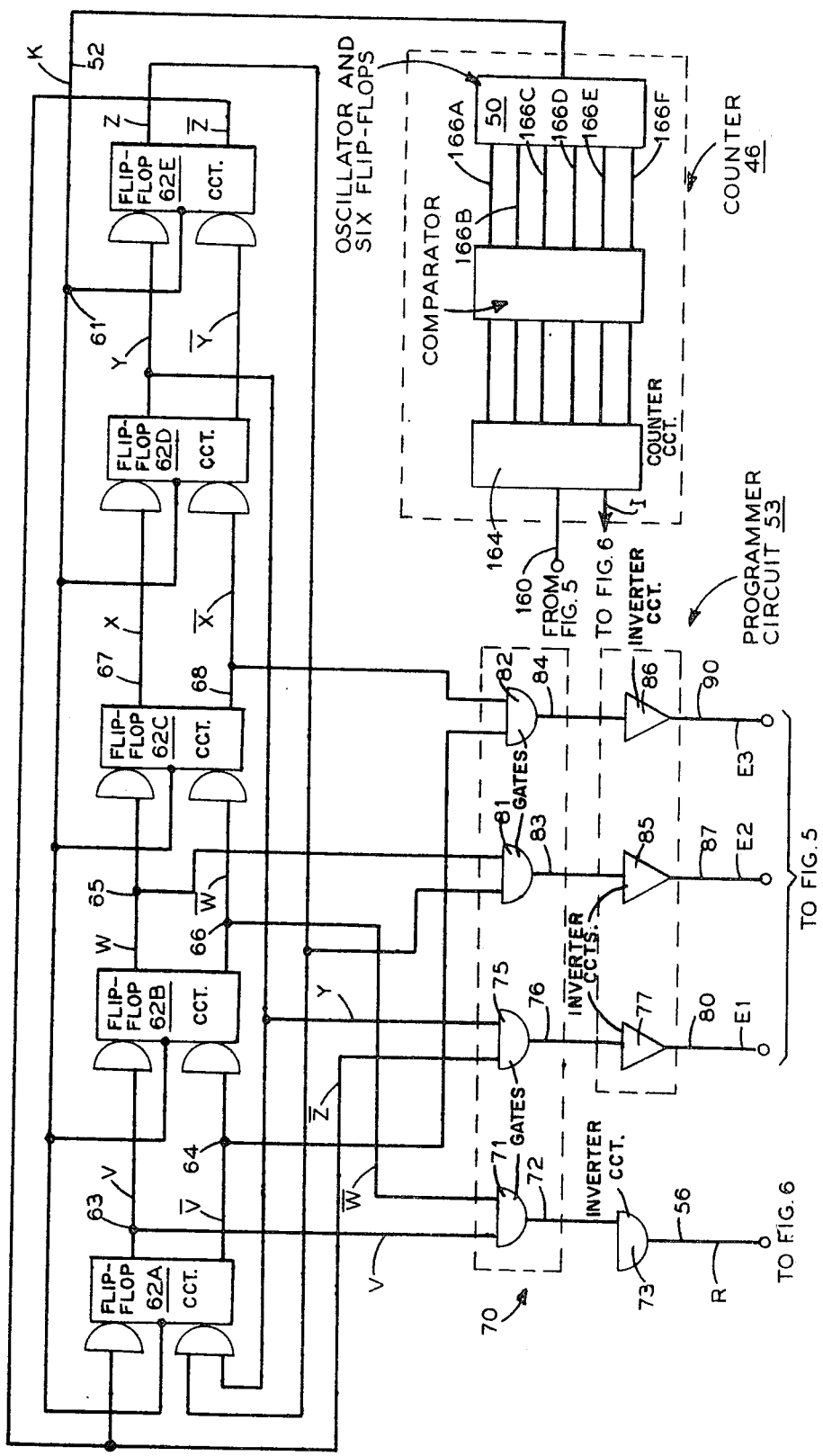

Turning now to a more specific circuit that illustrates principles of the invention, FIG. 4 shows a block diagram of the oscillator 50. Although not shown in FIG. 4, a typical oscillator 50 may comprise six oscillator flip-flop circuits and a 100 KHz clock signal circuit. The six flip-flop circuits change state in accordance with the 100 KHz clock signals. The states of these six flip-flops are continuously compared with six corresponding flip-flops in the counter 164 by means of six comparators. These six comparator circuits contrast the counter flip-flop states with the states of the oscillator flip-flops. When the counter and oscillator flip-flop circuits are in the same condition, a gate is enabled in order to emit a pulse that resets all of the oscillator flip-flops. In this manner, the oscillator flip-flop circuits cannot change state in response to the clock signals beyond a point that is determined by the radiation detector-related signal stored in the counter 46 (FIG. 1). In effect, this technique converts a radioactivity signal into a time signal because the oscillator flip-flop circuits change individual states until they match the states of the counter flip-flop circuits that represent the observed radiation registered in the counter 46. Accordingly, the oscillator output signal applied to the conductor 52 (waveform K in FIG. 2) represents the time required for the oscillator 50 to count up to a registered level of radioactivity.

The oscillator output signal in the conductor 52 is coupled as an error or control signal to the programmer circuit 53 (FIG. 4). The typical pulse train K of FIG. 2 in the conductor 52 corresponds to an apparent earth formation thermal neutron absorption characteristic.

The pulse train K, of course, is only exemplary of the many possible signals for suitably adjusting the operation of the programmer 53. In addition, the 10 μsec degree of confidence in the automatically derived value of τ provided by the 100 KHz clock in the oscillator 50 can be improved, for instance, through an increase in the frequency of the clock and through the addition of more stages to the clock-driven arrays of flip-flop circuits. Other types of variable-frequency oscillators, of which voltage-controlled oscillators are typical, also can be used within the sonde to generate an adequate response to the signals from the counter 46.

Figure 2:
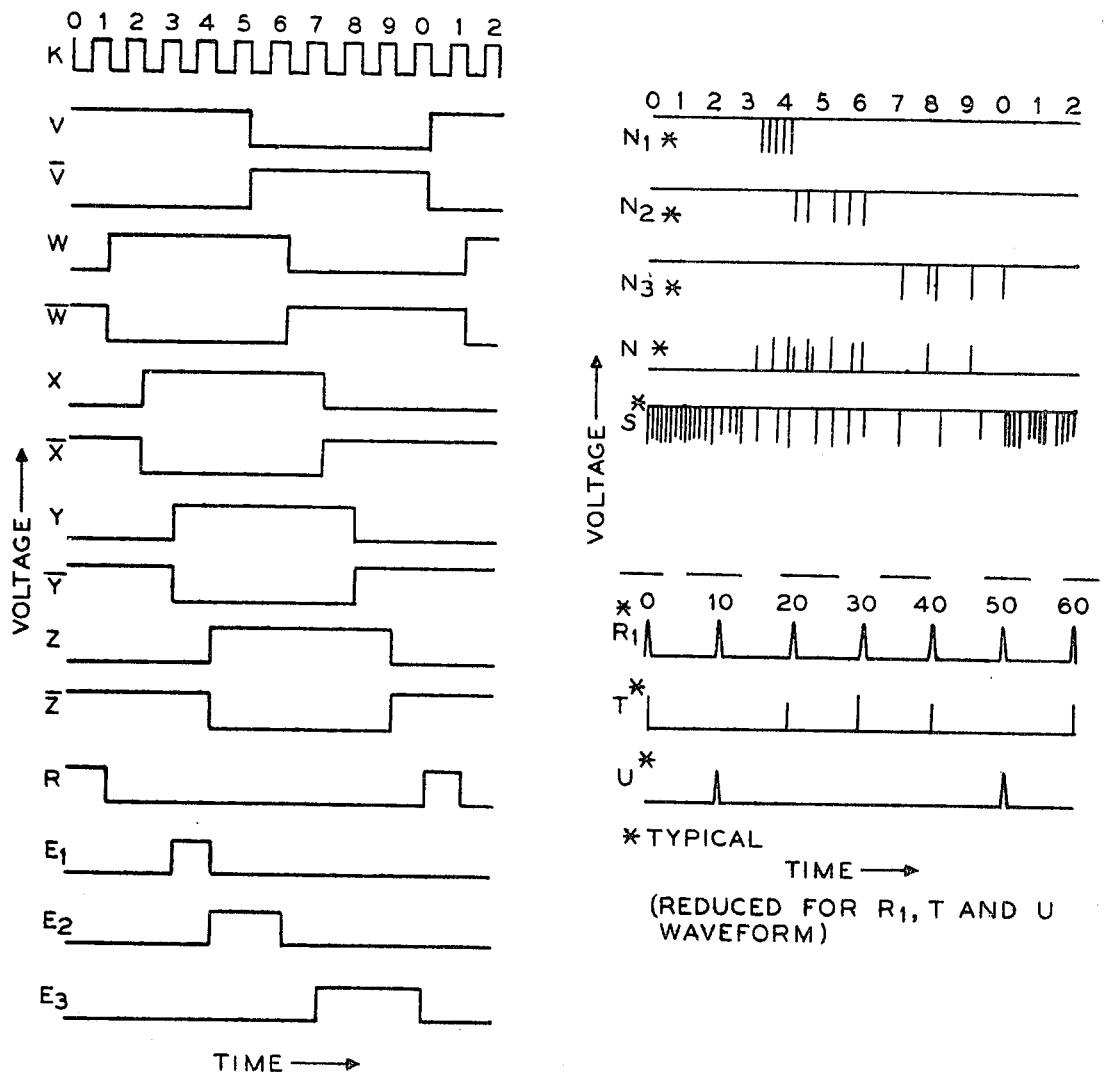
FIG. 2 is a graph of the various waveforms generated within the logging tool in accordance with one embodiment of the invention.

As shown in FIG. 2, the oscillator output pulses K recur at intervals equal to an apparent τ. These pulses, coupled to the programmer circuit 53 (FIG. 4), operate an array of five flip-flop circuits 62A to 62E in a way that alters the condition of the circuits in order to generate a series of waveforms V, W, X, Y and Z, and their complement waveforms $\overline{V}, \overline{W}, \overline{X}, \overline{Y}, \overline{Z}$ (FIG. 2), respectively. These waveforms subsequently are combined in the programmer circuit 53 to provide a group of gate enabling signals.

Thus, for example, the flip-flop circuit 62A responds to input signals that comprise the pulse train K in the conductor 52, waveform Y from the flip-flop 62D, and waveforms Z and $\overline{Z}$ from the flip-flop 62E. Stimulated by these inputs signals, the flip-flop circuit 62A generates signals in conductors 63 and 64 that correspond to waveform V and a complementary waveform $\overline{V}$, respectively. The duration of the complementary high and low voltage alterations in the V and $\overline{V}$ waveforms (FIG. 2) is 5τ in length. In a similar manner, the flip-flop 62b generates waveforms W and $\overline{W}$ in conductors 65 and 66, respectively, through a combination of the pulse train K and the V and $\overline{V}$ waveforms provided by the circuit 62A. The flip-flop 62c applies waveforms X and $\overline{X}$ to conductors 67 and 68, respectively, in response to the K, W and $\overline{W}$ signals. Through other combinations of the signals available to the programmer circuit 53, the circuit 62D generates the Y and $\overline{Y}$ signals, and the circuit 62E generates Z and $\overline{Z}$ signals.

As shown in FIG. 2, moreover, each of the voltage alternations characterizing the waveforms V, W, W, Y and Z is of 5τ in duration, and each of these alternations commence after a delay of τ relative to the waveform generated in the immediately preceding flip-flop circuit. The complement waveforms, moreover, also are spaced relative to each other in the same manner.

These waveforms are combined through an array of gates 70 (FIG. 4) to produce composite signals that control the duration and repetition rate of the neutron pulses as well as the duration and position in time of the detector signal observation intervals relative to the neutron pulses. For example, a gate 71 produces a relatively low voltage in conductor 72 if the gate input waveforms V and $\overline{W}$ are high. Conversely, if either or both of the waveforms V or $\overline{W}$ at the input to the gate 71 are low, the output signal from the gate 71 in the conductor 72 is high. An inverter circuit 73 reverses the polarity of the gate output in the conductor 72 and thereby generates the neutron pulse control signal R (FIG. 2) which is coupled through the conductor 56 to the neutron generator control circuit 23 (FIG. 1). Note in FIG. 2 that the waveforms V and $\overline{W}$ have simultaneous high voltages for a time of τ in duration that occurs only once in each cycle of operation in order to produce, after inversion, the positive pulses in the waveform R that mark the beginning of each cycle. Consequently, the positive R pulse lasts for a period equal to τ at the beginning of each 10τ interval.

Gate 75 is enabled in response to a simultaneous combination of the high voltage portions of the Y and $\overline{Z}$ waveforms. When enabled, the gate 75 emits a low voltage that is coupled through a conductor 76 to an inverting circuit 77. The inverter 77 generates the waveform $E_1$ (FIG. 2) that provides a positive pulse of τ in duration that occurs in the time that the Y and $\overline{Z}$ signals both are of high voltage. The $E_1$ pulse, transmitted through a conductor 80, enables gate 96 (FIG. 5) in the signal gate circuit 37 (FIG. 2) to pass radiation detector signals S (FIG. 2) registered during the time in which gate 96 was enabled.

Gates 81 and 82 also are enabled, in turn, through the logic rule that allows these gates to generate a low voltage output in conductors 83 and 84, respectively, in response to tim-coincident high voltages in the respective W, Z and $\overline{V}$, X waveforms. The low voltage enabled gate signals in the conductors 83 and 84 are transmitted to respective inverter circuits 85 and 86 in order to generate in output conductors 87 and 90 signals that correspond respectively to waveforms $E_2$ and $E_3$ (FIG. 2). Note that the waveforms $E_2$ and $E_3$ are of $2\tau$ and $3\tau$ duration, respectively. The positive portion of the $E_2$ waveform occurs, moreover, immediately after the positive $E_1$ signal terminates. The positive lobe of the $E_3$ waveform, however, starts only after a delay of $\tau$ in duration measured from the positive $E_2$ waveform cut-off.

Turning once more to FIg. 5, it is shown that the $E_2$ waveform in the conductor 87 enables a gate 97 in the signal gate circuit 37 in order to pass through the gate those gamma radiation detector signals S (FIG. 2) in conductor 93 that occur during a $2\tau$ interval that commences at a time $3\tau$ after the neutron pulse has subsided. In a like manner, the positive $E_3$ waveform in the conductor 90 enables a gate 95 for an interval of $3\tau$ that occurs at a time $6\tau$ after neutron pulse termination. In a similar manner, the positive portion of the $E_1$ waveform in the conductor 80 and simultaneously received detector signals in the conductor 93 enable a gate 96. The gate 96 then passes through those detector pulses that are registered during the enabled gate period.

In accordance with a specific technique illustrative of some of the features of the invention, the system under consideration responds to these gated radiation detector signals by subtracting from the detector signals observed during the times $E_1$ and $E_2$ waveform gate enabled intervals some of the detector signals that are registered during the time the $E_3$ waveform enables the gate 95. This, in effect, provides a "background radiation" count subtraction that reduces the influence of the earth formation's natural radioactivity on the thermal neutron decay time determination.

Subject to the background subtraction, the system further acts to maintain a constant ratio of counts observed during the gate enabled intervals provided by the $E_1$ and $E_2$ waveforms. Preferably, by maintaining a count ratio of 2:1 between the counts registered during the $E_1$ interval and those observed during the $E_2$ interval, an $E_1$ interval of duration that is equal to $\tau$ will be obtained.

To discriminate against noise and other spurious signals, as well as to provide a more suitable pulse for processing within the system, signals from the radiation detector 34 and the preamplifier 36 (FIG. 1) are applied to a Schmitt trigger circuit (not shown). The trigger circuit responds to this input by generating a rectangular pulse in response only to a signal that is of greater amplitude than some predetermined minimum discrimination level.

These trigger output pulses are coupled through a conductor 91 (FIg. 5) and a pulse inverting and clipping circuit 92 that further processes the detector signals to provide the narrow positive pulses that are required for subsequent handling in the signal gate circuit 37. These detector pulses are transmitted from the circuit 92 through the conductor 93 to a bus 94 that is connected in parallel to the three gate circuits 95, 96 and 97 as hereinbefore mentioned. The logic that controls the operation of the gates 95, 96 and 97 causes each of these gates to generate, in turn, a low voltage output in response to the simultaneous occurrence of a high voltage in the bus 94 and a high voltage in the associated enabling waveform conductors 90, 80 or 87, respectively.

In accordance with a feature of the invention, the detected radiation pulses that occur during the enabled gate intervals (that were established jointly with the detector pulses and the respective time-coincident positive portions of the waveforms $E_1$, $E_2$ or $E_3$) can be selected for transmission through the armored cable 10 (FIG. 1) to the earth's surface by means of an appropriate manipulation of a switch 103 (FIG. 1) on the earth's surface. More particularly, the downhole relay 28A (FIG. 5) controls a switch 102. The relay 28A is activated initially by operating the three-position switch 103 (FIG. 1) to apply negative battery 104 to the conductor 13 in the cable 10. It will be recalled that the latching relay 28, when energized, applies power to the downhole circuits in order to put the neutron generator 22 in the retard status. When the switch 103 is shifted to apply positive battery 104A to the conductor 13, the relay 28 responds by changing the position of the switch 25 in order to advance the neutron generator to full power status. Subsequent applications of the positive battery 104A to the conductor 13 do not release the switch 25 because the latching relay 28 holds the switch operated until the negative battery 104 is applied once more.

The relay 28A (FIG. 5), however, is not a latching relay. It is energized in response to each separate application of the positive battery through the switch 103. Single pole double-throw relay contacts 102, in response to a predetermined cycle of successive positive battery connections and interruptions, determines the specific interval during which the detector counts are to be observed.

As shown in FIG, 5, the switch 102 completes a circuit through to ground for a conductor 105. The conductor 105 when grounded, energizes a circuit 106 that eliminates the electrical effect of the mechanical "bounce" that ordinarily occurs during relay contact operation. This "bounce" tends to produce an effect that has the electrical appearance of several distinct circuit completions through the switch 103 when only one circuit completion was intended. If not corrected, as for example through the circuit 106, this effect naturally will produce a substantial error in the selection or the identification of the actual interval during which the detector signal is being observed. When the switch 103 (FIG. 1) is once more manipulated the relay 28A moves the switch 102 to disconnect ground from the conductor 105 and connect ground to a conductor 110. The conductor 110 also is connected to the circuit 106 in order to overcome relay contact bounce. The output from the circuit 106, however, is coupled through a conductor 111 to a further circuit 112. The circuit 112 comprises a two flip-flop circuit arrangement that responds to the successive activations of the relay 102 by changing the electrical condition in an array of output conductors. Depending on the status of the flip-flop circuits in the circuit 112, enabling signals are sent to gates 113, 114 and 115 through conductors 116, 117, 120 and 122.

In this manner, each successive energization of the relay 28A sends a pulse through the conductor 111 that ultimately opens one of the gates 113, 114 or 115 in order to allow the detector signals from the associated one of the gates 96, 97 or 95, respectively, to be applied to a conductor 121 for transmission to the earth's surface. For example, radiation detector signals from the inverting and clipping circuit 92 that occur during a time that corresponds to the positive portion of the $E_1$ waveform are gated through the circuit 96 to a conductor 100. These detector signals, when applied to the gate 113 along with appropriate enabling signals from the circuit 112 in the conductors 116 and 120 are coupled to the output conductor 121. In a similar manner, an appropriate combination of signals on the conductors 101, 117 and 122 open the gate 114 and apply to the conductor 121 the detector signals that occur during the second interval characterizing the positive portion of the waveform $E_2$ that are received from the gate 97. The gate 115, when enabled through signals in the conductors 117 and 120, apply the radiation detector pulses from the enabled gate 95 that occur during the positive portion of the $E_3$ waveform to the output conductor 121.

The radiation detector pulses in the conductor 121 during the period selected for observation by appropriate application of the positive battery 104 (FIG. 1) through the switch 103 are coupled through a circuit that includes a transmission processing flip-flop circuit 124. The flip-flop circuit 124 reduces or scales the detector pulses by a factor of four, thereby permitting one pulse to be transmitted through an output conductor 126 for every four detector pulses in the conductor 126. The conductor connects these pulses to a further scale-of-two flip-flop circuit 127.

As hereinbefore mentioned, thermal neutron decay information is sent through the cable 10 to the earth's surface in the form of positive pulses separated from each other by intervals of 10τ. To indicate the observed radiation detection count during any one of the chosen $E_1$, $E_2$ or $E_3$ enabling intervals, however, each time the accumulated counts applied to the scaling flip-flop circuits 124 and 127 reach a total of eight, a pulse of negative polarity is coupled to the cable 10 instead of the usual 10τ positive pulse.

For instance, if the gate 113 (FIG. 5) is enabled in order to observe the counts registered during the time the gate 96 is opened by the waveform $E_1$ (FIG. 2), a pulse train similar to $N_1$ (FIG. 2) is passed through the gates 96 and 113. In this circumstance, the pulse train $N_1$ also is applied through the conductor 121 to the scale-of-four flip-flop circuit 124. The circuit 124 responds to this signal by sending one pulse for each successive group of four detector pulses through the conductor 126 to the scale-of-two flip-flop circuit 127.

The circuit 127 further increases pulse scaling by a factor of two to present an output conductor 130 with one pulse for each group of eight detector pulses.

In a similar manner, depending on the activation history of the relay 28A, the circuits 124 and 127 reduce in scale the pulses in the trains $N_2$ or $N_3$ (FIG. 2) by a factor of eight. If detector count information is not required, relay 28A can be operated repeatedly until all three outputs of gates 113, 114 and 115 are inhibited.

Figure 6:
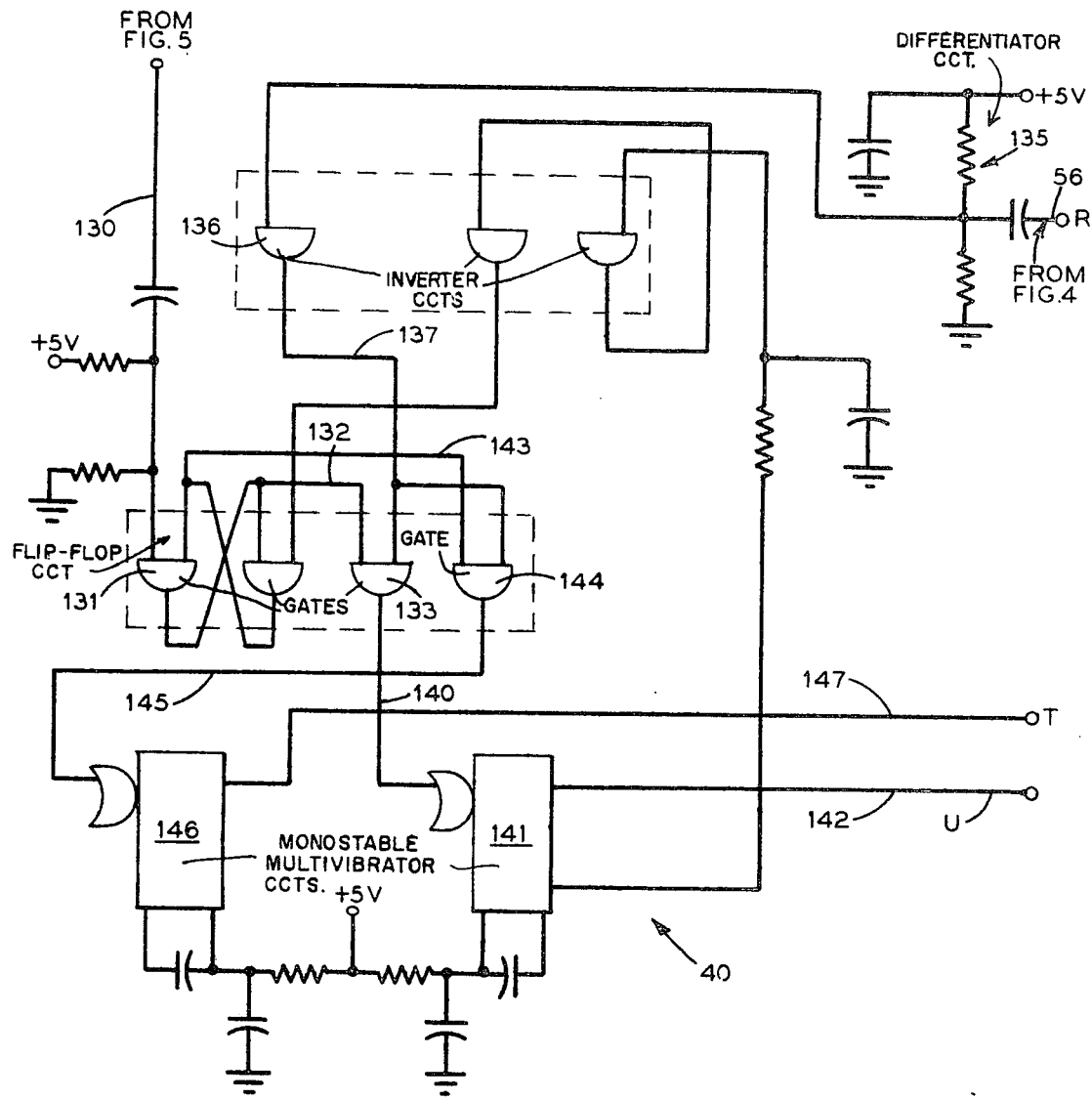

The scale-of-eight pulse in the conductor 130 is coupled to a flip-flop circuit 131 in the cable transmission driver circuit 40 (FIG. 6). If the flip-flop circuit 131 is in the reset condition, the output from the circuit 131 is applied through a conductor 132 to a gate circuit 133. The enabling signal for the gate 133 is received at intervals of 10τ that correspond to the waveform R (FIG. 2) through a path from the counter 46 (FIG. 4) that includes the conductor 56 (FIGS. 4 and 6), a differentiator 135, a polarity inverting circuit 136 and a conductor 137.

The pulse trains shown in FIg. 2 are, of course, only representative in nature. For instance, the duration of the enabling intervals and the positions in time of these intervals relative to the neutron pulse depend on the thermal neutron absorption properties of the earth formation under observation. Other suitable parameters can be chosen to control tool operation if desired.

Figure 5:
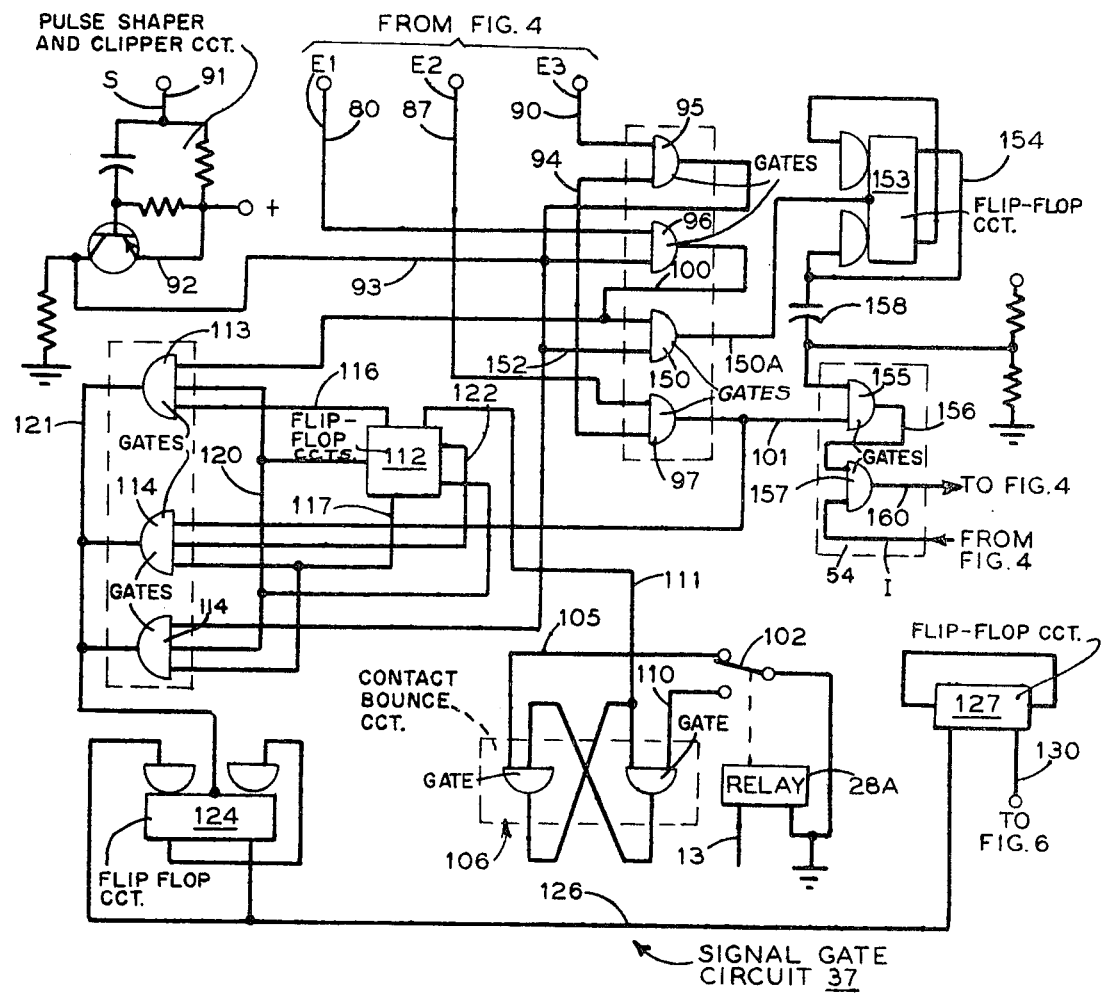
FIGS. 4 to 6 are detailed circuit diagrams that are typical of the downhole portions of the system shown schematically in FIG. 1.
Figure 3:
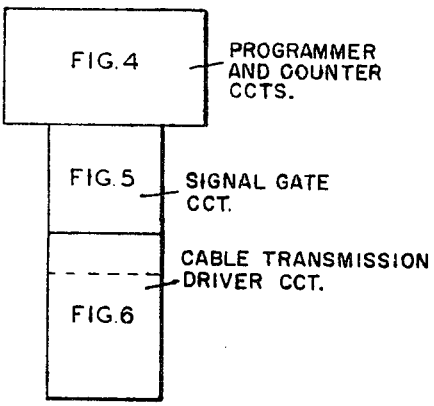
Fig. 3 shows the general arrangement of FIGS. 4 to 6.

Turning once more to the gate 133 in FIG. 6, when enabled the gate emits an output pulse that is applied through a conductor 140 to a monostable multivibrator 141 which generates an output signal of positive polarity that is applied to a conductor 142. Pulse train U in FIG. 2 is typical of the sort of signal that is coupled to the conductor 142. If eight detector pulses have not registered during the interval under observation since the preceding 10τ pulse in the conductor 137, the gate 133 is not enabled. In this situation the multivibrator 141 does not apply a 10τ signal to the conductor 142. Thus, the pulses that comprise the waveform U do not recur at regular 10τ intervals, but appear only in response to the accumulation of eight detector counts in the interval, or a sequence of the interval, that was selected for observation through the operation of the relay 28A (FIG. 5).

Signals in the conductor 137 and in a conductor 143 that is connected to the gate 131 enable a gate 144 that applies a 10τ pulse through a conductor 145 to a monostable multivibrator 146. The multivibrator 146 applies positive 10τ pulses to a conductor 147 as shown in pulse train T (FIG. 2). As indicated through a comparison of the pulse trains T and U shown in FIG. 2, a 10τ interval signal pulse is applied to the conductor 147 only in the absence of a pulse in the conductor 142 that, it will be recalled, indentifies the cumulative count in one of the observation intervals.

A polarity inverting circuit (not shown) is coupled to the conductor 142 in order to change the positive polarity of the signal in the pulse train U (FIG. 2) to a negative polarity. After the inversion of the polarity of the signal in the conductor 142, both the inverted U pulse train and the T signal pulses are coupled downhole to the monocable conductor 13 (FIG. 1) through the conductor 41, the choke coil 33 and the capacitors 32 and 31. In this manner, each time eight detector counts are registered in the detector during the interval selected for observation, the 10τ pulse applied to the cable 10 has a negative polarity. Inasmuch as the elapsed time between two successive negative 10τ pulses is measured readily, the count rate during the interval under observation also can be determined.

To regulate the interval between pulses in the trains T and U in order to reflect accurately a fixed multiple of the time required for the earth formation under investigation to decrease the thermal neutron population by a factor of $1/e$, a further circuit in the downhole sonde solves the equation:

$$N = \tfrac{1}{2}(N_1 + N_3) - N_2 \quad (1)$$

in which $N_1$, $N_2$ and $N_3$ are the number of counts registered during the intervals in which the gates 113, 114 and 115 (FIG. 5) are enabled.

In the illustrative embodiment, if the thermal neutron decay time of the earth formation is equal to the apparent value of τ that is computed with the circuits in question, $N = 0$. A departure from this equality, in which $N \ne 0$, produces an error signal in the circuit to be described that tends to restore the system to an $N = 0$ condition through the regulation of the digitally controlled oscillator 50 (FIG. 4).

More specifically, as shown in FIG. 5, $N_1$ signals passed by the enabled gate 96 are applied to a gate 150 through the conductor 100. At the appropriate subsequent time, the $N_3$ signals from the enabled gate 95 also are applied to the gate 150. These $N_1$ and $N_3$ signals are passed through the gate 150 to a conductor 150A to provide a signal that corresponds to the expression:

$$N_1 + N_3 \quad (2)$$

A flip-flop circuit 153 responds to the $N_1 + N_3$ signal to produce one output pulse for every two input pulses, thereby dividing the sum of $N_1$ and $N_3$ by two. This latter circuit function consequently generates a signal that corresponds to the expression:

$$\tfrac{1}{2}(N_1 + N_3) \quad (3)$$

A conductor 154 couples the divided signal through a differentiator 158 to a gate circuit 155. The gate circuit 155 is enabled in response to the differentiated signal in the conductor 154 and a signal that corresponds to the pulse train $N_2$ in the conductor 101 that are received from the enabled gate 97. The gate 155 thus combines the $N_1$, $N_2$ and $N_3$ aggregate signals registered during each 10τ interval into an electrical equivalent of the expression:

$$\tfrac{1}{2}(N_1 + N_3) + N_2 \quad (4)$$

The departure from the desired $N + 0$ condition in an output conductor 156 from the gate is computed in the counter 164 (FIG. 4).

Although not shown in FIG. 4, a suitable counter circuit 164 combines the sequentially received $n_1$, $N_2$ and $N_3$ signals after they have been processed in the manner described in connection with the signal gate circuit 37. These processed signals, applied to a gate 157, are gated out to a conductor 160, except when inhibited by a low voltage on the I input, conductor 54. The I or inhibit signal is obtained from the counter circuit 164 when it approaches its maximum capacity. In the counter 164 a serially connected group of flip-flop circuits respond to each received pulse by changing the electrical states of the respective output conductors. At the end of the $N_1$ pulse train, a reset pulse conditions the counter 164 to receive the next group of pulses by "complementing" the $\tfrac{1}{2}N_1$ signal stored in the flip-flops. This complementing step is carried out through changing the status of each of the individual flip-flops.

Subsequently, the processed $N_2$ pulses are received in the counter 164 from the enabled gate 157. The $N_2$ signal is added to the complemented $N_1/2$ signal stored in the counter. The resultant count is complemented again. This is, in effect, a subtraction that leaves a residual $N_1/2 - N_2$ signal in the counter 46.

Finally, the $N_3/2$ signal is received in the counter circuit 164 and is added to the residual stored there to produce a stored net signal. The digital equivalent of this value is gated out through conductors 166A through 166F to the variable frequency oscillator 50. The output frequency of the oscillator changes in response to the magnitude of the signal in a way that tends to produce an $N=0$ condition for the entire system.

As hereinbefore mentioned, if the $N=0$ status is attained $\tau$ apparent is equal to $\tau$ of the formation. The circuit 164 and the oscillator 50 attain this condition through the effect produced by means of the oscillator output pulse train K (FIG. 2) in the conductor 52. These pulses, it will be recalled, adjust the operation of the downhole circuits to transmit the T and negative U pulses up the cable 10 to the earth's surface at intervals of $10\tau$.

On the earth's surface, the $10\tau$ pulses are passed through the capacitor 43 (FIG. 1) and the high pass filter 44 to the output pulse processing system 45. The filter 44 passes low-frequency noise to ground and allows the higher frequency $10\tau$ pulses to pass through to the processing system 45. The pulse processing system preferably makes a record of the thermal neutron decay time $\tau$ and the gamma ray activity during the preselected observation interval between each neutron pulse. Usually this record is photographic, or recorded on tape for subsequent computer analysis and processing, or the like. Other recording techniques are also suitable for use in connection with the invention. In order to indicate the depth of the portion of the formation under observation, moreover, casing collar locator signals from an electromagnetic casing collar locator on the sonde (not shown) are applied to the processing system 45 through a capacitor 48 and a conductor 49 when the switch 103 is connected to a terminal 48A on the earth's surface.

The pulse processing system 45 preferably includes a noise-eliminating pulse height discriminator circuit that is set to accept pulses for further analysis only if these pulses exceed a predetermined minimum amplitude. A circuit for distinguishing the input pulse polarity also can be included in the processing system. As previously mentioned, transmission through the cable 10 degrades the sharply defined quality of the T and negative U pulse trains coupled downhole to the cable. At the earth's surface, these pulses are received as a varying amplitude burst of alternating current in which the negative polarity count information pulses are received as a mirror image of the positive input pulses.

In order to identify the polarity of these input pulses, further trigger circuits in the processing system 45 respond to the relative position of the positive and negative voltage fluctuations in each of these signal bursts. The signals thus identified can be combined to provide a continuous record of the thermal neutron decay time as a function of borehole depth. The negative U pulses also can be segregated to provide a record of counts as a function of $\tau$ during the observation interval selected through the operation of the downhole relay 28A. Preferably, all of this data is presented in terms of borehole depth.

It is understood that the techniques characterizing this invention are not limited to thermal neutron decay time observations but can be applied, for example, to the measurement of other parameters of which the macroscopic thermal neutron absorption cross section and the thermal neutron lifetime are typical. Pulse X-rays and other physical phenomena also can be observed through the application of the physical principles of the invention.

Separate conductors can be provided for any combination or all of the power and transmitted signals disclosed herein, although the foregoing description has been directed to a monocable logging system. It is, of course, also within the scope of the invention to make use of more or less detector signal observation intervals through an appropriate choice of gates and switch positions for the relay 28A.

What is claimed is:

1. A logging system comprising a direct current power supply on the earth's surface having an adjustable voltage output to produce at least two selectable predetermined voltages, a sonde for transport through a borehole formed in the earth, signal transmission means for coupling said power supply to said sonde, means for selectively connecting said adjustable direct current power supply to said signal transmission means, neutron generator means within said sonde for irradiating the earth formation thereabout with pulses of neutrons, radiation detector means within said sonde and responsive to the neutron characteristics of said earth formation for producing a signal that is related to a property of said formation, and switch means within said sonde responsive to one of said adjustable direct current outputs to activate said neutron generator means and responsive to another of said direct current outputs to initiate neutron production.

2. A logging system according to claim 1 further comprising circuit means responsive to said switch means for transmitting to the earth's surface a signal of one polarity that corresponds to the formation's neutron characteristic, and a signal of another polarity that corresponds to said neutron characteristic and a portion of said radiation detector signal.

3. A logging system according to claim 1 wherein said switch means comprise a latching relay responsive to said direct current outputs to activate said neutron generator means and to produce neutrons from said generator, respectively, and a relay responsive to only one of said outputs to select a portion of said radiation detector signal according to successive applications of said output.

4. A logging tool circuit comprising a neutron generator, a radiation detector for producing signals in response to operation of said neutron generator, means for transmitting signals from the logging tool, and switch means responsive to direct current signals for selectively activating said neutron generator and producing neutrons therefrom and choosing portions of said radiation detector signal for application to said transmission means, said switch means further comprises a relay sensitive to successive direct current signals for choosing said radiation detector signal portions in response to a sequence of said signals, and another relay for activating said neutron generator in accordance with another of said direct signals.

5. A logging tool circuit according to claim 4 further comprising a plurality of signal gates, each respectively responsive to a successive activation of said one signal sensitive relays to gate through individual portions of said radiation detector signal to said signal transmitting means.

6. A logging tool circuit according to claim 5 wherein said signal transmitting means further comprises a current inverter circuit for changing the polarity of the transmitted signal each time said gated through radiation detector signal portion reaches a predetermined level.

* * * * *